United States Patent
Caldwell et al.

(10) Patent No.: US 11,046,213 B2
(45) Date of Patent: Jun. 29, 2021

(54) SEATING ASSEMBLY BRACKET

(71) Applicant: Ford Global Technologies, LLC, Dearborn, MI (US)

(72) Inventors: Clayton Caldwell, Royal Oak, MI (US); Cung K. Chieu, Tecumseh (CA); Joseph Michael Kish, Canton, MI (US); George Jacob, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 16/242,205

(22) Filed: Jan. 8, 2019

(65) Prior Publication Data

US 2020/0215939 A1   Jul. 9, 2020

(51) Int. Cl.
*B60N 2/20* (2006.01)
*B60N 2/02* (2006.01)
*B60N 2/68* (2006.01)

(52) U.S. Cl.
CPC .............. *B60N 2/20* (2013.01); *B60N 2/028* (2013.01); *B60N 2/686* (2013.01)

(58) Field of Classification Search
CPC ........ B60N 2/20; B60N 2/2222; B60N 2/028; B60N 2/686
See application file for complete search history.

(56) References Cited

U.S. PATENT DOCUMENTS

| | | | |
|---|---|---|---|
| 4,789,204 A | 12/1988 | Kanazawa | |
| 4,909,572 A | 3/1990 | Kanai | |
| 7,802,852 B2* | 9/2010 | Siegrist | B60N 2/686 297/452.18 |
| 9,108,541 B2 | 8/2015 | Assmann et al. | |
| 9,199,555 B2* | 12/2015 | Livesey | B60N 2/20 |
| 9,539,920 B2* | 1/2017 | Muller | B60N 2/045 |
| 9,969,306 B1* | 5/2018 | Lin | B60N 2/2213 |
| 10,287,019 B2* | 5/2019 | Erb | B64D 11/0641 |
| 10,427,554 B2* | 10/2019 | Ketels | B60N 2/0252 |
| 2019/0184870 A1* | 6/2019 | Clark | B60N 2/68 |
| 2020/0017009 A1* | 1/2020 | Susko | B60N 2/919 |

FOREIGN PATENT DOCUMENTS

JP       2013091360       5/2013

* cited by examiner

*Primary Examiner* — David R Dunn
*Assistant Examiner* — Tania Abraham
(74) *Attorney, Agent, or Firm* — David Coppiellie; Price Heneveld LLP

(57) ABSTRACT

A vehicle seating assembly includes a seatback having a base. A reclining portion is pivotably coupled to the base at first and second attachment points and includes first and second longitudinal members. A panel is disposed between the first and second longitudinal members. A cross member extends between the first and second attachment points. A bracket is coupled to the panel and is disposed between the panel and the cross member.

9 Claims, 6 Drawing Sheets

SEATING ASSEMBLY BRACKET

FIELD OF THE DISCLOSURE

The present disclosure generally relates to a bracket for a vehicle seating assembly.

BACKGROUND OF THE DISCLOSURE

Vehicle seating assemblies may include many components. Components of a vehicle seating assembly may interfere with one another during movement of a vehicle seating assembly between various positions.

SUMMARY OF THE DISCLOSURE

According to a first aspect of the present disclosure, a vehicle seating assembly includes a seatback including a base. A reclining portion is pivotably coupled to the base at first and second attachment points and includes first and second longitudinal members. A panel is disposed between the first and second longitudinal members. A cross member extends between the first and second attachment points. A bracket is coupled to the panel and is disposed between the panel and the cross member.

Embodiments of the first aspect of the disclosure can include any one or a combination of the following features:
- the bracket includes an elongated channel having a curved portion;
- the cross member is disposed in the curved portion of the elongated channel;
- the bracket is fixedly coupled to the panel and wherein the bracket and the reclining portion are positionable between an upright position and a reclined position;
- the bracket includes a first mounting area and a second mounting area and wherein the elongated channel is disposed between the first mounting area and the second mounting area;
- the first mounting area and the second mounting area include respective first and second flanges configured to attach the bracket to the panel;
- an axis extends between the first and second attachment points and wherein the reclining portion is pivotable around the axis;
- the cross member defines the axis;
- the cross member does not contact the bracket when the reclining portion is in the upright position and when the reclining portion is in the reclined position; and
- at least one of the first and second attachment points includes a locking mechanism configured to retain the reclining portion in the upright position, the reclined position, and one or more intermittent positions between the upright position and the reclined position.

According to a second aspect of the present disclosure, a vehicle seating assembly includes a seatback. A cross member is disposed between first and second longitudinal members of the seatback. A bracket partially surrounds the cross member and includes a mounting portion for securing the bracket to the seatback and a recess receiving the cross member.

Embodiments of the second aspect of the disclosure can include any one or a combination of the following features:
- first and second rotary locking mechanisms secured to the first and second longitudinal members of the seatback and operably coupled with first and second ends of the cross member, wherein the seatback comprises a base and a reclining portion, and wherein the reclining portion of the seatback is rotatable about an axis extending between the first and second rotary locking mechanisms;
- the mounting portion includes a first mounting area and a second mounting area; and
- the recess includes a U-shaped cross-section.

According to a third aspect of the present disclosure, a vehicle seating assembly includes a bracket mounted to a seatback and includes first and second mounting areas. First and second extension portions extend away from the respective first and second mounting areas. First and second shielding portions extend inwardly from the first and second extension portions. A curved portion is disposed between the first and second shielding portions. The curved portion defines a recess for receiving a cross member.

Embodiments of the third aspect of the disclosure can include any one or a combination of the following features:
- the first mounting area includes a first flange and wherein the second mounting area includes a second flange;
- the first flange includes a first length, wherein the second flange includes a second length, and wherein the first length of the first flange is less than the second length of the second flange;
- the first extension portion includes a first length of the first extension portion, wherein the second extension portion includes a second length of the second extension portion, and wherein the first length of the first extension portion is less than the second length of the second extension portion;
- the first shielding portion includes a first width, wherein the second shielding portion includes a second width, and wherein the first width of the first shielding portion is less than the second width of the second shielding portion; and
- the recess is further defined by a line tangential to the first and second shielding portions and wherein the cross member is disposed between the line tangential to the first and second shielding portions and a line tangential to the curved portion.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
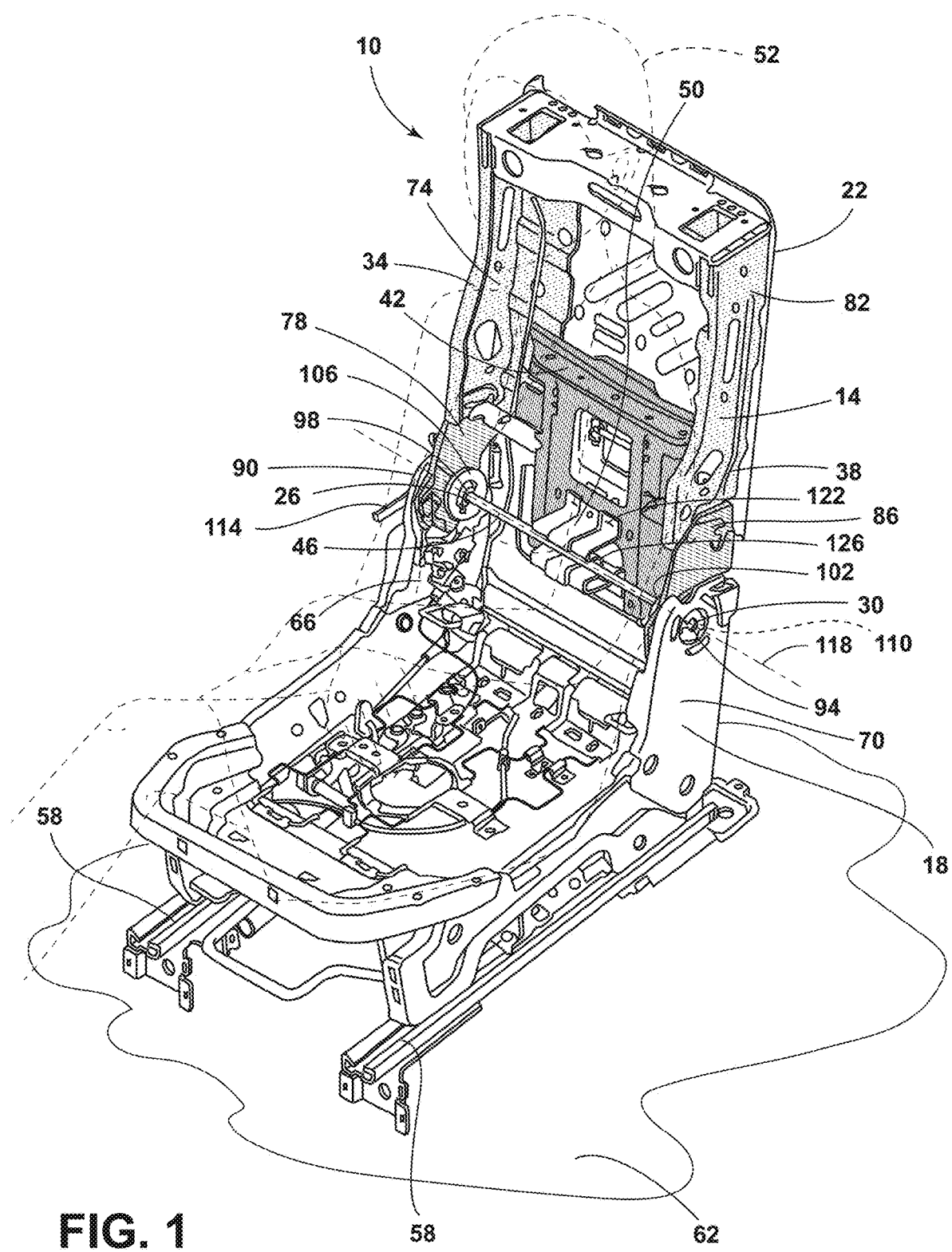
FIG. 1 is a perspective front view of a seating assembly including a bracket, according to an embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1-8, a vehicle seating assembly 10 may include a seatback 14. The seatback 14 may include a base 18 and a reclining portion 22 pivotably coupled to the base 18 at first and second attachment points 26, 30. The reclining portion 22 may include first and second longitudinal members 34, 38. The reclining portion 22 may also include a panel 42 disposed between the first and second longitudinal members 34, 38, a cross member 46 extending between the first and second attachment points 26, 30, and a bracket 50 coupled to the panel 42 and disposed between the panel 42 and the cross member 46.

The seating assembly 10 may be described with reference to an occupant 52 seated in the seating assembly 10. Parts to the right side of a seated occupant 52 may be referred to by the term first. Parts to the left side of the seated occupant 52 may be referred to by the term second.

With reference to FIG. 1, a vehicle seating assembly 10 is shown. The vehicle seating assembly 10 may include a seat 54 and a seatback 14. The seat 54 may be mounted to rails 58 that may be secured to a floor 62 of a vehicle. The seatback 14 may include a base 18 and a reclining portion 22. The base 18 may include a first base member 66 and a second base member 70.

The reclining portion 22 may be coupled to the base 18. The first longitudinal member 34 may include a first upper portion 74 and a first lower portion 78. The second longitudinal member 38 may include a second upper portion 82 and a second lower portion 86. A first lower portion 78 of the first longitudinal member 34 may be coupled to the first base member 66. A second lower portion 86 of the second longitudinal member 38 may be coupled to the second base member 70. The reclining portion 22 may be rotationally coupled to the base 18 at first and second pivot points 90, 94. A cross member 46 may extend between the first pivot point 90 and the second pivot point 94.

The cross member 46 may be useful because the cross member 46 may connect the first and second attachment points 26, 30. A first end 98 of the cross member 46 may be coupled to the first attachment point 26. A second end 102 of the cross member 46 may be coupled to a second attachment point 30. The first and second attachment points 26, 30 may each include a respective first rotary locking mechanism 106, a second locking mechanism 110, or another positioning mechanism. The cross member 46 may act as a connecting member for securing the first rotary locking mechanism 106 to the second rotary locking mechanism 110. In the example shown, an actuator 114 may be coupled to the first rotary locking mechanism 106. The actuator 114 may disengage and engage the first rotary locking mechanism 106. The disengagement of the first rotary locking mechanism 106 may allow the cross member 46 and the second rotary locking mechanism 110 to rotate in response to the rotation of the first rotary locking mechanism 106. The second rotary locking mechanism 110 may disengage in a similar manner to the first rotary locking mechanism 106. The engagement of the actuator 114 with the first rotary locking mechanism 106 may secure the seatback 14 at a particular angle. When the actuator 114 engages with the first rotary locking mechanism 106 in a particular position, then the cross member 46 may rotate to cause the second rotary locking mechanism 110 to engage in a similar manner to the first rotary locking mechanism 106. As such, when the occupant 52 manipulates the actuator 114 to adjust a relative angle of the seatback 14, the first and second rotary locking mechanisms 106, 110 may be synchronized. Because the first and second rotary locking mechanisms 106, 110 may be synchronized, the first and second rotary locking mechanisms 106, 110 may engage and disengage simultaneously. In some examples, the cross member 46 may be referred to as a recliner synchronization crosstalk rod.

Figure 4:
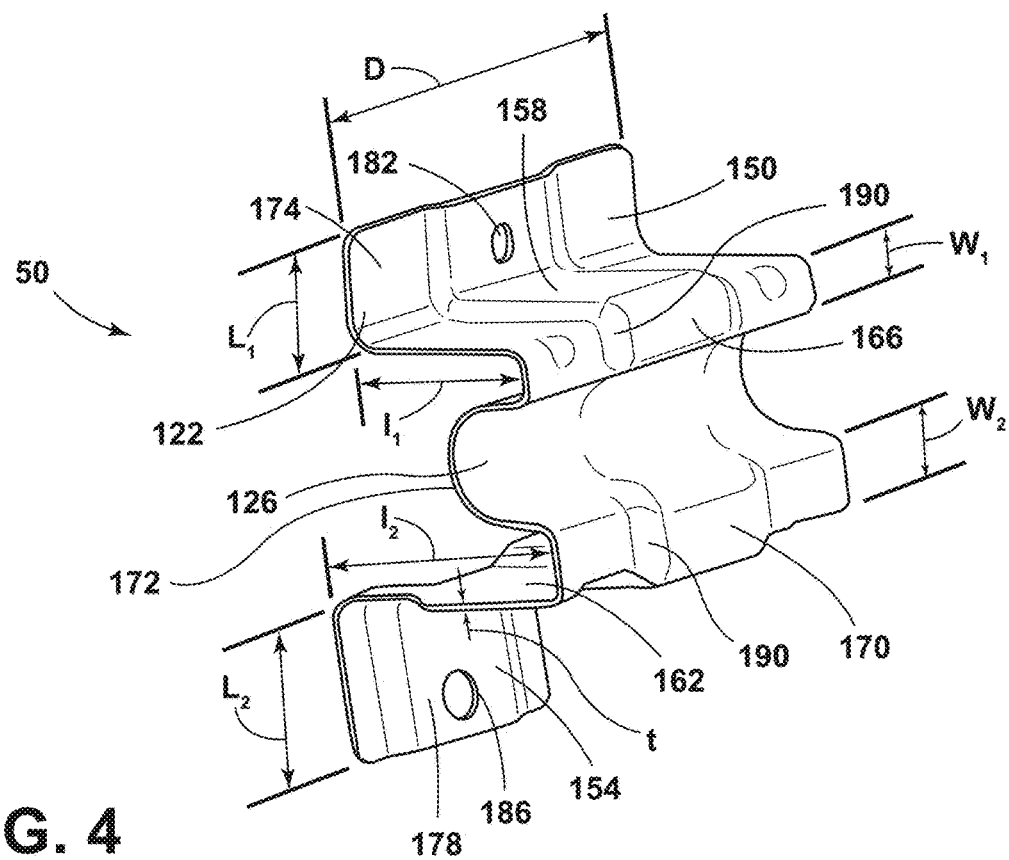
FIG. 4 is a perspective view of the bracket, according to an embodiment.

With continued reference to FIG. 1, the cross member 46 may be a cross rod. In various examples, the cross rod may be solid. In various examples, the cross rod may be hollow or tubular. The cross rod may define an axis 118 extending between the first pivot point 90 and the second pivot point 94. The reclining portion 22 of the seatback 14 may include a panel 42 disposed between the first longitudinal member 34 and the second longitudinal member 38. A bracket 50 may be disposed on the panel 42. The bracket 50 may include a mounting portion 122 for securing the bracket 50 to the panel 42. The bracket 50 may include a channel 126 for receiving the cross member 46. The channel 126 may be elongated, and the channel 126 may extend along the distance D of the bracket 50 (FIG. 4).

Figure 2:
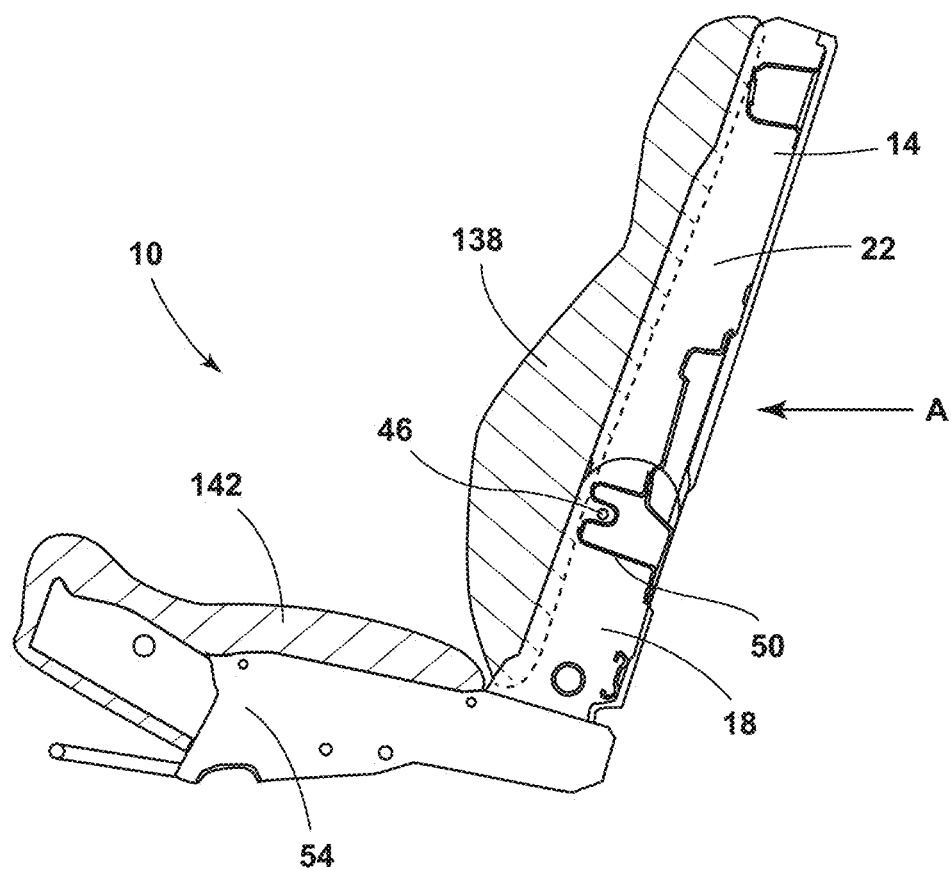
FIG. 2 is a cross-sectional view of a seating assembly with the seatback in an upright position, according to an embodiment.
Figure 3:
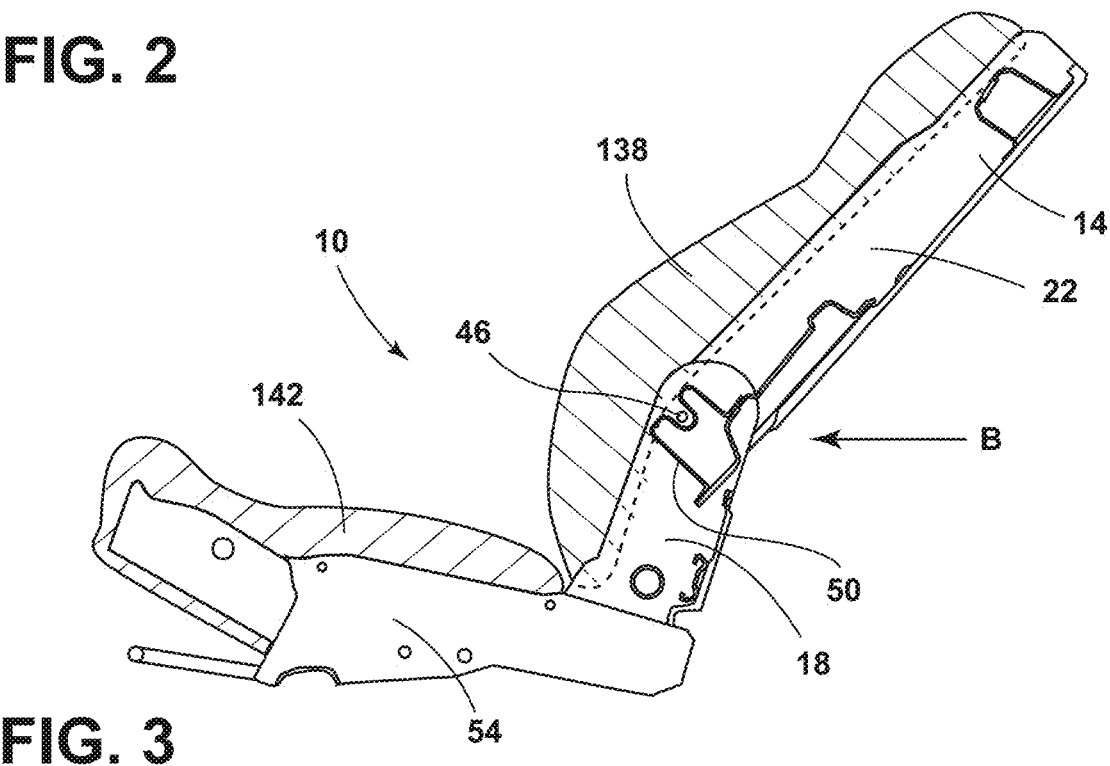
FIG. 3 is a cross-sectional view of a seating assembly with the seatback in a reclined position, according to an embodiment.
Figure 3A:
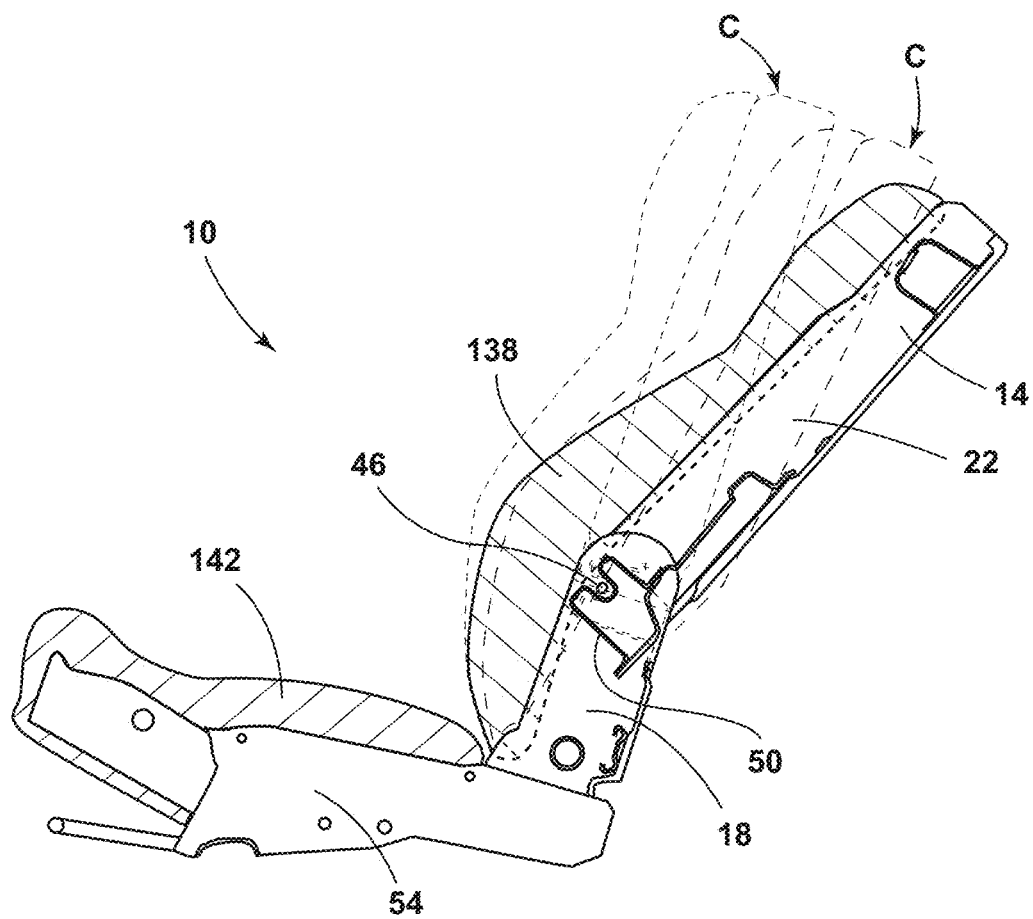
FIG. 3A is a cross-sectional view of a seating assembly with the seatback in intermittent positions, according to an embodiment.

Referring now to FIGS. 2-3A, the seatback 14 may be movable between an upright position A (FIG. 2) and a reclined position B (FIG. 3). Similarly, the seatback 14 may be movable between a reclined position B (FIG. 3) and an upright position A (FIG. 2). As the seatback 14 moves from the upright position A (FIG. 2) to the reclined position B (FIG. 3), the bracket 50 moves with the seatback 14 from the upright position A (FIG. 2) to the reclined position B (FIG. 3). The bracket 50 may be fixedly coupled to the panel 42. The seatback 14 may be positionable in one or more intermittent positions C between the upright position A and the reclined position B (FIG. 3A). The reclining portion 22 of the seatback 14 may be rotatable around the axis 118 extending between the first pivot point 90 and the second pivot point 94. The reclining portion 22 of the seatback 14 may be pivotable about the axis 118 extending between the first pivot point 90 and the second pivot point 94 between at least an upright position A (FIG. 2) and a reclined position B (FIG. 3). The reclining portion 22 of the seatback 14 may be rotatable around the axis 118 extending between the first pivot point 90 and the second pivot point 94 between at least a reclined position B (FIG. 3) and an upright position A (FIG. 2).

With continuing reference to FIGS. 2-3A, as previously discussed, at least one of the first and second attachment points 26, 30 (see FIG. 1) may include a respective first rotary locking mechanism 106 or a second rotary locking mechanism 110 configured to retain the reclining portion 22 in at least the upright position A, the reclined position B, and one or more intermittent positions C between the upright position A and the reclined position B. An actuator 114 for disengaging and engaging the first or second rotary locking mechanism 106, 110 may be disposed at one of the first or second attachment points 26, 30 (FIG. 1). The actuator 114 may be activated to disengage the first or second rotary locking mechanism 106, 110 to position the reclining portion 22 between at least upright and reclined positions A, B and in one or more intermittent positions C between upright and reclined positions A, B. The actuator 114 may be activated to engage the first or second rotary locking mechanisms 106, 110 to secure the seatback 14 in the upright position A, the reclined position B, one or more intermittent positions C between the upright position A and the reclined position B, and other positions.

With continuing reference to FIGS. 2-3A, a seatback cushion 138 may be disposed in the seatback 14. A seat cushion 142 may be disposed on the seat 54. The seatback cushion 138 and the seat cushion 142 may provide a seatback surface and a seat surface for an occupant 52 of the seating assembly 10.

Vehicle seating assemblies may be designed to meet various needs. As such, vehicle seating assembly designs may maintain the functionality of a seat while keeping a satisfactory level of comfort for a seating assembly occupant. It may be desirable to protect a cross member such as a recliner synchronization crosstalk rod from seat cushion movement proximate the cross member. In certain conventional seatback configurations, a seatback cushion may interfere with a cross member during movement of the reclining portion of a seatback between an upright position and a reclined position. In certain conventional seatback configurations, the seatback cushion may come into contact with the cross member and may become pinched in the spaces between the cross member and seat parts near the cross member. In certain conventional seatback configurations, and during movement of the seatback between an upright position and a reclined position, a seatback cushion pinched next to the cross member may interfere with the pivoting of the seatback between an upright position and a reclined position. A pinched seatback cushion next to the cross member may cause movement of the seatback between upright and reclined positions to be difficult. Therefore, it may be desirable for the bracket to include features that protect the cross member from the seatback cushion during movement of the seatback between an upright position and a reclined position.

It may also be desirable for the bracket to have a shape that may minimize interference with a vehicle seating assembly hip point (H-point). A vehicle seating assembly H-point refers to a hip point of a passenger. The H-point may be set at a predetermined location for purposes of safety during a collision event. When designing vehicle seating assemblies, design parameters require that the H-point of a mannequin be aligned with the predetermined H-point for a particular vehicle seating assembly in a vehicle. Adherence to a predetermined H-point may be a legal and a practical requirement which directly affects a crash restraint of an occupant during a collision event. The H-point may position the head of an occupant at an appropriate position relative to the head restraint on the vehicle seating assembly and relative to the roof of the vehicle. Accordingly, the H-point may be an important parameter for vehicle seating assembly safety. Therefore, the bracket may be sized appropriately as to not extend beyond a certain distance from the panel so as to minimize interference with a predetermined H-point for a particular vehicle seating assembly.

With continued reference to FIGS. 2-3A, it should be appreciated that the bracket 50 may protect the cross member 46 from interference from a seatback cushion 138 as well as other seatback parts (for example, foam pieces).

With reference now to FIG. 4, a perspective view of the bracket 50 is shown. The bracket 50 may include a mounting portion 122. The mounting portion 122 may include a first mounting area 150 and a second mounting area 154. The bracket 50 may include a first mounting area 150 for mounting the bracket 50 to a panel 42 or a similar seatback structure. The bracket 50 may include a second mounting area 154 for mounting the bracket 50 to a panel 42 or a similar seatback structure. A first extension portion 158 may extend away from the first mounting area 150. A second extension portion 162 may extend away from the second mounting area 154. A first shielding portion 166 may extend inwardly from the first extension portion 158. A second shielding portion 170 may extend inwardly from the second extension portion 162. An elongated channel 126 may be disposed between the first shielding portion 166 and the second shielding portion 170. The elongated channel 126 may include a curved portion 172. The curved portion 172 may include a U-shaped cross section 173.

Figure 5:
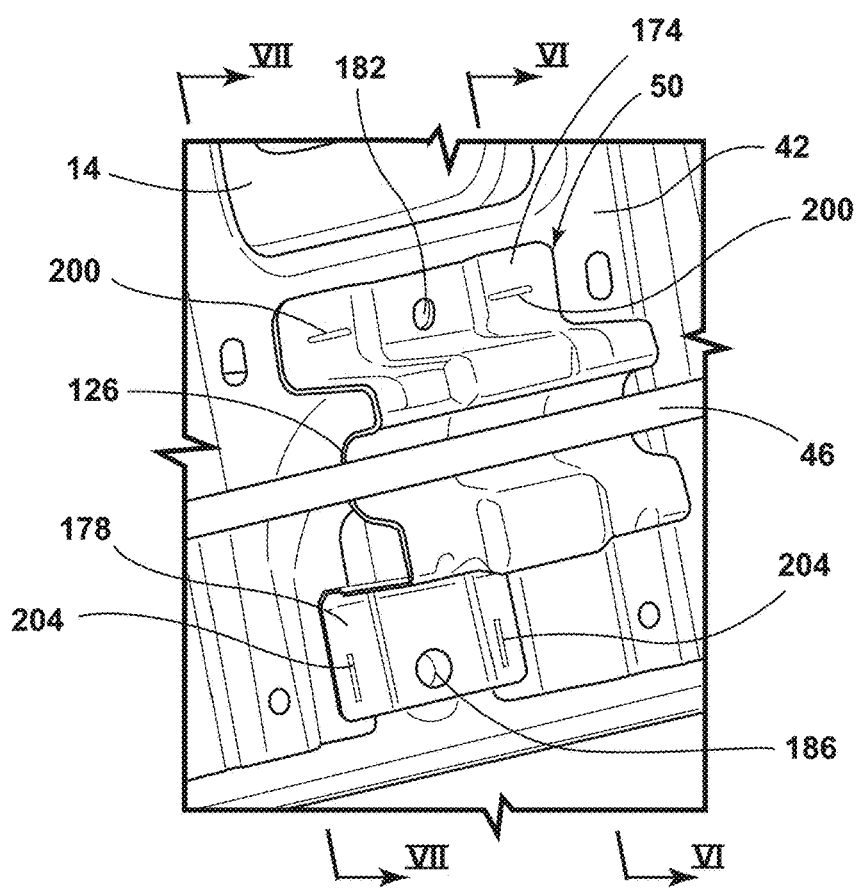
FIG. 5 is a perspective front view of a portion of a seatback including the bracket and a cross member, according to an embodiment.

With continuing reference to FIG. 4, the first mounting area 150 of the bracket 50 may include a first flange 174. The first flange 174 may be generally orthogonal to the first extension portion 158. The second mounting area 154 of the bracket 50 may include a second flange 178. The second flange 178 may be generally orthogonal to the second extension member 162. A first aperture 182 may be disposed on a first flange 174. A second aperture 186 may be disposed on a second flange 178. The first and second apertures 182, 186 may receive fasteners for mounting the first and second flanges 174, 178 to the panel 42 (FIG. 5).

With continued reference to FIG. 4, the first flange 174 may span a first length $L_1$. The second flange 178 may span a second length $L_2$. The first length $L_1$ may be shorter than the second length $L_2$. The first extension portion 158 may span a first length $L_1$. The second extension portion 162 may span a second length 12. The first length $L_1$ may be shorter than the second length 12. The first shielding portion 166 may include a first width $W_1$. The second shielding portion 170 may include a second width $W_2$. The first width $W_1$ may be less than the second width $W_2$. The bracket 50 may span a distance D across the seatback 14. The bracket 50 may have a thickness t of approximately 1.5 mm.

The bracket 50 may include strengthening ribs 190 positioned on the bracket 50. A strengthening rib 190 may include a generally planar portion and a portion that extends generally transverse to the planar portion.

The bracket 50 may be formed by a conventional metal forming process. The conventional metal forming process may include a progressive stamping operation.

The design parameters of the bracket 50 may be varied to suit various seatback panel 42 contours, seatback 14 spaces, seating assembly H-points, or other seating assembly 10 considerations.

In various embodiments, the bracket 50 may be fabricated of more than one part.

In various embodiments, the bracket 50 may be fabricated of a polymer or other material.

With reference to FIG. 5, the bracket 50 is shown mounted to the panel 42 of the seatback 14. The cross member 46 is shown disposed in the channel 126 of the bracket 50. As previously explained, the first flange 174 may include a first aperture 182 for receiving a fastener for securing the bracket 50 to the panel 42. The first flange 174 may include first slots 200 for receiving protrusions of the panel 42 in the bracket 50. The protrusions and the first slots 200 may be used to position the first flange 174 on the panel 42. As previously explained, the second flange 178 may include a second aperture 186 for receiving a fastener for securing the bracket 50 to the panel 42. The second flange 178 may include second slots 204 for receiving protrusions of the panel 42 in the bracket 50. The protrusions and the second slots 204 may be used to position the second flange 178 on the panel 42.

Figure 6:
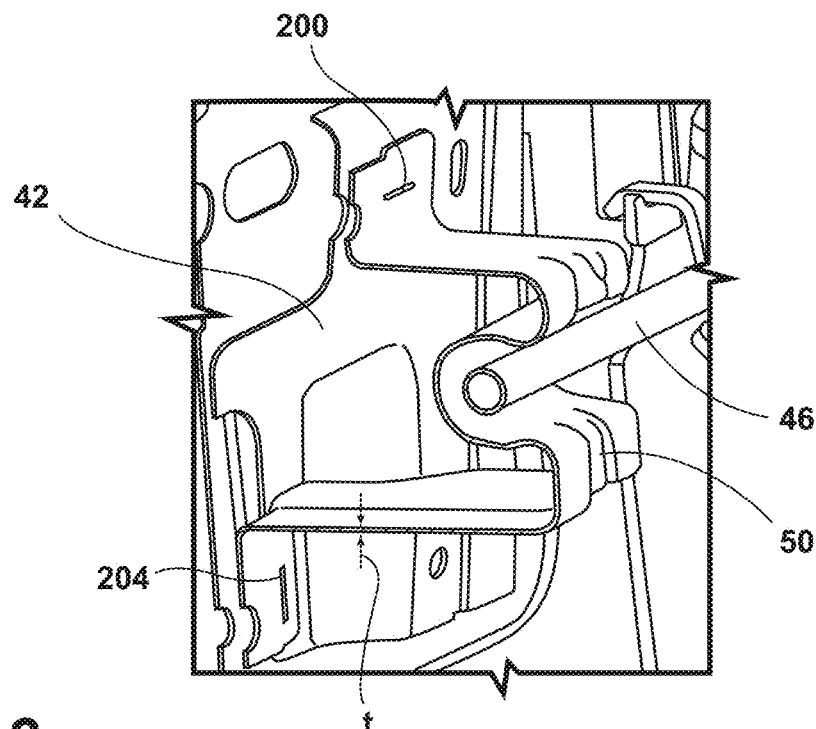
FIG. 6 is a perspective cross-sectional view of a portion a seatback including the cross member disposed in a channel of the bracket, according to an embodiment.

With reference to FIG. 6, a cross-sectional view of the cross member 46 and the bracket 50 is shown. The cross-sectional view may be taken along line VI-VI of FIG. 5. As previously discussed, the cross member 46 may be a hollow tube. In some examples, the bracket 50 may have a uniform thickness t.

Figure 7:
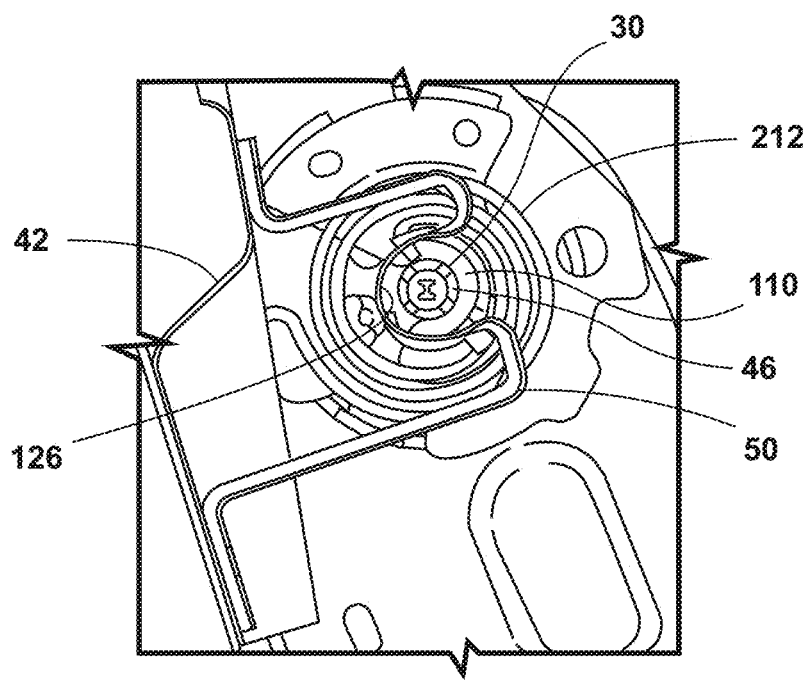
FIG. 7 is an elevational side view of the bracket and a cross member disposed in a channel of the bracket, according to an embodiment.

With reference to FIG. 7, an additional cross-sectional view of the bracket 50 and the cross member 46 is shown. The cross-sectional view may be taken along line XII-XII of FIG. 7. A coiled spring 212 may be disposed proximate the second attachment point 30. The coiled spring 212 may provide a spring bias to the second rotary locking mechanism 110. The bracket 50 is shown disposed on the panel 42. The curved portion 172 of the bracket 50 may define a recess (channel 126) for receiving the cross member 46.

Figure 8:
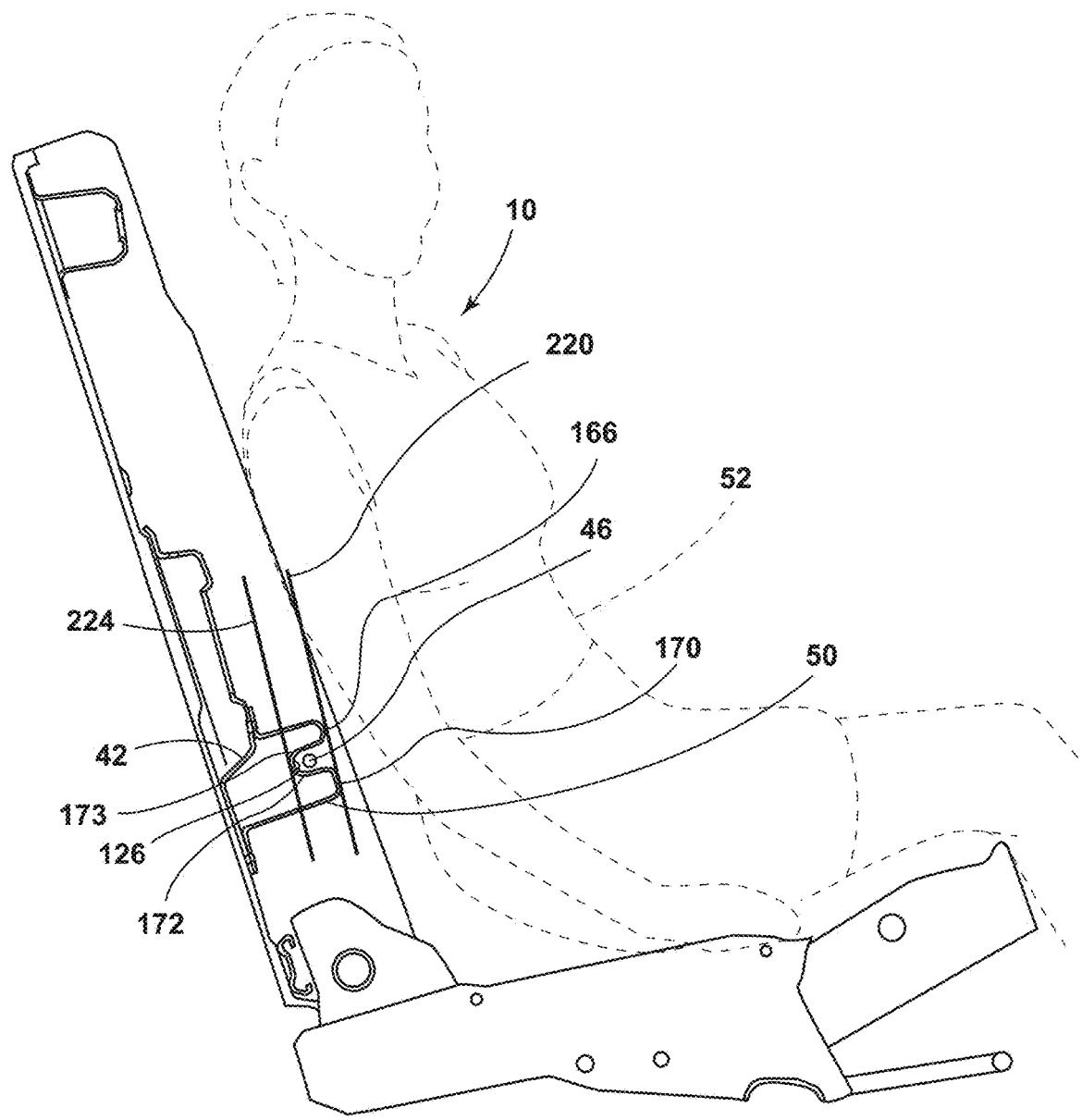
FIG. 8 is cross-sectional side view of a seating assembly including the bracket and the cross member, according to an embodiment.

Referring to FIG. 8, a cross-sectional schematic view of the seating assembly 10 is shown. The bracket 50 is shown disposed on the panel 42. As previously explained, the curved portion 172 of the bracket 50 may define a recess (channel 126) for receiving the cross member 46. The recess may be further defined by a line 220 tangential to the first and second shielding portions 166, 170 and a line 224 tangential to the curved portion 172. The line 224 may be tangential to a bottom point of the U-shaped cross section 173.

In various embodiments, the cross member 46 may avoid contact with the bracket 50 during use of the seating assembly 10 by an occupant 52. When the seatback 14 moves between at least an upright position A, a reclined position B, and intermittent positions C between at least an upright position A and a reclined position B, then the cross member 46 may avoid contact with the bracket 50.

A variety of advantages may be derived from use of the present disclosure. A compact bracket may utilize a generally minimal amount of space in a seatback. The shielding portions of the bracket may achieve the goal of shielding the cross member from cushions and other seatback parts. The shielding portions of the bracket may shield the cross member and partially surround the cross member. The bracket may maintain an occupant H-point while providing an occupant comfort. The bracket may be sized to provide a space between the bracket and the occupant for receipt of a cushion that may minimize the likelihood that the occupant may feel the bracket. The bracket may be economical.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seating assembly comprising:
a seatback including a base; and
a reclining portion pivotably coupled to the base at first and second attachment points and including:
first and second longitudinal members;
a panel disposed between the first and second longitudinal members;
a cross member extending between the first and second attachment points; and
a bracket coupled to the panel and disposed between the panel and the cross member, wherein the bracket includes an elongated channel having a curved portion, wherein the cross member is disposed in the curved portion of the elongated channel, wherein the bracket is fixedly coupled to the panel, wherein the bracket and the reclining portion are positionable between an upright position and a reclined position, wherein the bracket includes a first mounting area and a second mounting area, wherein the elongated channel is disposed between the first mounting area and the second mounting area, wherein the first mounting area and the second mounting area include respective first and second flanges configured to attach the bracket to the panel, wherein an axis extends between the first and second attachment points, wherein the reclining portion is pivotable around the axis, wherein the cross member defines the axis, and wherein the cross member does not contact the bracket when the reclining portion is in the upright position and when the reclining portion is in the reclined position.

2. The vehicle seating assembly of claim 1, wherein at least one of the first and second attachment points includes a locking mechanism configured to retain the reclining portion in the upright position, the reclined position, and one or more intermittent positions between the upright position and the reclined position.

3. A vehicle seating assembly comprising:
a seatback;
a cross member disposed between first and second longitudinal members of the seatback;
a panel extending between the first and second longitudinal members of the seatback;
a bracket partially surrounding the cross member and including:
a mounting portion having first and second mounting areas extending substantially parallel to the cross member and configured to secure the bracket to the panel; and
a recess for receiving the cross member, wherein at least one of the first and second mounting areas includes a distance substantially parallel to the cross member, wherein the distance substantially parallel to the cross member defines the greatest dimension of the at least one of the first and second mounting areas; and first and second rotatry locking mechanisms secured to the first and second longitudinal members of the seatback and operably coupled with first and second ends of the cross member, wherein the seatback comprises a base and a reclining portion, and wherein the reclining portion of the seatback is rotatable about an axis extending between the first and second rotary locking mechanisms.

4. The vehicle seating assembly of claim 3, wherein the first mounting area and the second mounting area are disposed on opposing sides of the cross member.

5. The vehicle seating assembly of claim 4, wherein the recess includes a U-shaped cross-section.

6. A vehicle seating assembly comprising:
a bracket mounted to a seatback and including:
 first and second mounting areas;
 first and second extension portions extending away from the respective first and second mounting areas;
 first and second shielding portions extending inwardly from the first and second extension portions; and
 a curved portion disposed between the first and second shielding portions, wherein the curved portion defines a recess receiving a cross member, wherein the first mounting area includes a first flange, wherein the second mounting area includes a second flange, wherein the first flange includes a first length, wherein the second flange includes a second length, and wherein the first length of the first flange is less than the second length of the second flange.

7. The vehicle seating assembly of claim 6, wherein the first extension portion includes a first length of the first extension portion, wherein the second extension portion includes a second length of the second extension portion, and wherein the first length of the first extension portion is less than the second length of the second extension portion.

8. The vehicle seating assembly of claim 6, wherein the first shielding portion includes a first width, wherein the second shielding portion includes a second width, and wherein the first width of the first shielding portion is less than the second width of the second shielding portion.

9. The vehicle seating assembly of claim 6, wherein the recess is further defined by a line tangential to the first and second shielding portions and wherein the cross member is disposed between the line tangential to the first and second shielding portions and a line tangential to the curved portion.

* * * * *